(12) United States Patent
Montagnon

(10) Patent No.: US 9,181,824 B2
(45) Date of Patent: Nov. 10, 2015

(54) METHOD FOR PRODUCING AN INTERNAL COMBUSTION ENGINE VALVE AND VALVE OBTAINED IN THIS MANNER

(75) Inventor: Jacques Montagnon, La Varenne St Hilaire (FR)

(73) Assignee: AUBERT & DUVAL, Paris (FR)

( * ) Notice: Subject to any disclaimer, the term of this patent is extended or adjusted under 35 U.S.C. 154(b) by 1166 days.

(21) Appl. No.: 12/159,113

(22) PCT Filed: Jan. 22, 2007

(86) PCT No.: PCT/FR2007/000121
§ 371 (c)(1),
(2), (4) Date: Oct. 28, 2008

(87) PCT Pub. No.: WO2007/085720
PCT Pub. Date: Aug. 2, 2007

(65) Prior Publication Data
US 2009/0301615 A1     Dec. 10, 2009

(30) Foreign Application Priority Data

Jan. 26, 2006 (FR) ..................... 06 00724

(51) Int. Cl.
*C21D 8/00* (2006.01)
*F01L 3/02* (2006.01)
(Continued)

(52) U.S. Cl.
CPC ... *F01L 3/02* (2013.01); *C21D 1/10* (2013.01); *C21D 1/26* (2013.01); *C21D 6/002* (2013.01);
(Continued)

(58) Field of Classification Search
CPC ............ C21D 1/00; C21D 1/02; C21D 6/002; C21D 7/00; C21D 7/13; F01L 2103/00
USPC ...... 123/47 AB; 148/542, 547, 609, 627, 649
See application file for complete search history.

(56) References Cited

U.S. PATENT DOCUMENTS 4,737,201 A    4/1988  Larson
4,741,080 A    5/1988  Larson
(Continued)

FOREIGN PATENT DOCUMENTS

DE    4212966 A1    10/1993
DE    0670375    *  6/1995    ............... C21D 9/00
(Continued)

OTHER PUBLICATIONS

Patent Abstracts of Japan, vol. 1999, No. 13, Nov. 30, 1999 & JP 11 217653, Sanyo Special Steel Co., Ltd, Aug. 10, 1999.
(Continued)

*Primary Examiner* — Melvin C Mayes
*Assistant Examiner* — Alexander Polyansky
(74) *Attorney, Agent, or Firm* — Sughrue Mion, PLLC; Richard C. Turner

(57) ABSTRACT

The invention concerns a method for making a unitary spark ignition valve, characterized in that it consists in preparing and casting a steel made up in wt. % of: 0.45%≤C 0.55%; 12%≤Cr≤18%; 1%≤Si≤2.5%; traces≤Mn≤2%; 0.2%≤V≤0.5%; traces≤Mo≤0.5%; 0.05%≤N≤0.15%, with 0.55%≤C+N≤0.70%; traces≤Ni≤1%; traces≤Cu≤0.25%, or Cu≤0.5 Ni if Cu>0.25%; traces≤Co≤1%; traces≤W≤0.2%; traces≤Nb≤0.15%; traces≤Al≤0.025%; traces≤Ti≤0.010%; traces≤S≤0.030%; traces≤P≤0.040%; traces≤B≤0.0050%; the balance being iron and impurities resulting from the preparation; in transforming by hot thermomechanical process, for example, by rolling and/or forging between 1000 and 1200° C.; optionally soft annealing, between 650 and 900° C. for 2 to 8 hours followed by air or furnace cooling; and performing the final thermal or thermomechanical treatments which will impart to the valve its shape and its final properties, including hot-shaping by forging or extrusion, and in a final manufacturing step a localized surface quenching, such as a high-frequency quenching, a plasma or a laser shock quenching, performed on certain parts of the valve. The invention also concerns a unitary spark ignition engine valve obtained by said method.

16 Claims, 3 Drawing Sheets

(51) Int. Cl.
*C21D 1/10* (2006.01)
*C21D 1/26* (2006.01)
*C21D 6/00* (2006.01)
*C21D 7/13* (2006.01)
*C21D 9/00* (2006.01)
*C21D 10/00* (2006.01)
*C22C 38/02* (2006.01)
*C22C 38/04* (2006.01)
*C22C 38/06* (2006.01)
*C22C 38/18* (2006.01)
*C22C 38/42* (2006.01)
*C22C 38/44* (2006.01)
*C22C 38/46* (2006.01)
*C22C 38/48* (2006.01)
*C22C 38/50* (2006.01)
*C22C 38/52* (2006.01)
*C22C 38/54* (2006.01)
*F01L 3/04* (2006.01)
*C21D 8/02* (2006.01)
*C21D 1/00* (2006.01)

(52) U.S. Cl.
CPC ............... *C21D 7/13* (2013.01); *C21D 9/0068* (2013.01); *C21D 10/00* (2013.01); *C22C 38/02* (2013.01); *C22C 38/04* (2013.01); *C22C 38/06* (2013.01); *C22C 38/18* (2013.01); *C22C 38/42* (2013.01); *C22C 38/44* (2013.01); *C22C 38/46* (2013.01); *C22C 38/48* (2013.01); *C22C 38/50* (2013.01); *C22C 38/52* (2013.01); *C22C 38/54* (2013.01); *F01L 3/04* (2013.01); *C21D 2211/008* (2013.01); *F01L 2101/00* (2013.01); *F01L 2103/00* (2013.01)

(56) References Cited

U.S. PATENT DOCUMENTS

| | | | | |
|---|---|---|---|---|
| 5,084,113 | A * | 1/1992 | Mori et al. | 148/525 |
| 6,099,668 | A * | 8/2000 | Ueta et al. | 148/607 |
| 6,635,128 | B1 | 10/2003 | Neumann et al. | |
| 2003/0044304 | A1 * | 3/2003 | Montagnon et al. | 420/48 |

FOREIGN PATENT DOCUMENTS

| | | | |
|---|---|---|---|
| DE | 4406896 C1 | 6/1995 | |
| DE | 19620914 A1 | 11/1997 | |
| GB | 771137 | 3/1957 | |
| JP | 6-17609 | 1/1994 | |
| JP | 06017609 A * | 1/1994 | F01L 1/14 |
| JP | 11-335791 | 12/1999 | |

OTHER PUBLICATIONS

Patent Abstracts of Japan, vol. 2000, No. 03, Mar. 30, 2000 & JP 11 335791, Aichi Steel Works, Ltd., Dec. 7, 1999.
Patent Abstracts of Japan, vol. 2000, No. 11, Jan. 3, 2001 & JP 2000 226641, NSK Ltd, Aug. 15, 2000.
Patent Abstracts of Japan, vol. 1999, No. 8, Jun. 30, 1999 & JP 11 061351, Daido Steel Co., Ltd., Mar. 5, 1999.
Patent Abstracts of Japan, vol. 013, No. 510, Nov. 15, 1989 & JP 01 205063 Daido Steel Co., Ltd., Aug. 17, 1989.
M. Obayashi et al, "High Temperature Corrosion of Some Heat Resisting Steels in the Presence of Lead Oxide", J. Japan Inst. Metals, vol. 36, No. 2, (1972) pp. 156-164.
"X45CrSi93, Valve Steel", Kalyani Carpenter Special Steels, 2008.
"Stainless Steel", Fante's Kitchen Wares Shop—fantes.com, pp. 1-7, undated.
"16CD4", DIN 15CrMo5, Steel Data, Ravne Metals, Nov. 4, 2005, pp. 1-4.

* cited by examiner

METHOD FOR PRODUCING AN INTERNAL COMBUSTION ENGINE VALVE AND VALVE OBTAINED IN THIS MANNER

This is a 371 of International Application PCT/FR2007/000121 filed on Jan. 22, 2007, which claims priority from FR 0600724 filed Jan. 26, 2006; the entire disclosure of the prior application is hereby incorporated by reference.

The invention relates to ferrous metallurgy. More precisely, it relates to the production of internal combustion engine valves.

BACKGROUND OF THE INVENTION

A preferred application of the invention is the production of inlet valves for diesel engines, referred to as "EGR" types (exhaust gases recycling), in which these valves are placed in contact with combustion gases which are reinjected at the inlet in order to ensure the complete combustion thereof and the reduction of the quantity of polluting discharged products.

When they are used, these valves can locally reach temperatures of from 400 to 500° C. and are subjected to high levels of mechanical stress and a corrosive environment. Furthermore, the condensates which are deposited on the valves during a prolonged idle period of this type of engine are also very aggressive.

Under these aggressive conditions, the grades of carbon steels, low-alloyed steels and chromium- and silicon-alloyed steels which are conventionally used to produce valves have insufficient resistance to corrosion.

Austenitic steels which are highly alloyed offer a very good level of resistance to corrosion under these conditions but their material cost is significantly higher.

Furthermore, these austenitic steels cannot be hardened by means of quenching. The contacting surface of the valve and the end of the stem thereof must have high levels of hardness and good resistance to abrasion. Generally, valves of austenitic steel are therefore constituted by from two to three components, including:
- the valve seat contacting surface, which is produced from an alloy which has a high level of hardness, which is resistant to corrosion, and which is deposited by means of coating,
- the coldest end of the stem, which is produced from a martensitic steel which is capable of high levels of hardness by means of quenching.

In all cases, this increases the cost of the valve.

Furthermore, the high creep resistance of austenitic steels is not advantageous at temperatures less than or equal to 500° C. Finally, the lower thermal conductivity of austenitic steels is rather disadvantageous in practice.

The use of austenitic steels therefore constitutes "excessive quality" in some respects and also has technical disadvantages. Furthermore, the high cost of implementing this solution makes it on the whole unsatisfactory at an industrial level.

There is therefore a need on the part of motorists to have a method which allows inlet valves to be produced for EGR diesel engines which have high levels of mechanical property during operation and a high level of resistance to corrosion, whilst retaining a low production cost, in particular since it would be possible to produce this valve in the form of a single solid component.

SUMMARY OF THE INVENTION

To this end, the invention relates to a method for producing a unitary valve for an internal combustion engine, characterised in that:

- a steel is produced and cast having a composition, in percentages by weight, of:
  - $0.45\% \leq C \leq 0.55\%$
  - $12\% \leq Cr \leq 18\%$
  - $1\% \leq Si \leq 2.5\%$
  - trace levels $\leq Mn \leq 2\%$
  - $0.2\% \leq V \leq 0.5\%$
  - trace levels $\leq Mo \leq 0.5\%$
  - $0.05\% \leq N \leq 0.15\%$, with $0.55\% \leq C+N \leq 0.70\%$
  - trace levels $\leq Ni \leq 1\%$
  - trace levels $\leq Cu \leq 0.25\%$, or $Cu \leq 0.5$ Ni if $Cu > 0.25\%$
  - trace levels $\leq Co \leq 1\%$
  - trace levels $\leq W \leq 0.2\%$
  - trace levels $\leq Nb \leq 0.15\%$
  - trace levels $\leq Al \leq 0.025\%$
  - trace levels $\leq Ti \leq 0.010\%$
  - trace levels $\leq S \leq 0.030\%$
  - trace levels $\leq P \leq 0.040\%$
  - trace levels $\leq B \leq 0.0050\%$ the balance being iron and impurities resulting from the production operation;

- it is thermomechanically transformed in the hot state, for example, by means of rolling and/or forging between 1000 and 1200° C.;
- a softening annealing operation is optionally carried out between 650 and 900° C. for from 2 to 8 hours followed by cooling in air or in the oven;
- and the final thermal or thermomechanical processing operation(s) is/are carried out which will confer on the valve the definitive properties and/or shape thereof, involving hot forming by means of forging or extrusion, and ending the production with a localised surface quenching operation, such as an HF quenching operation, plasma quenching or laser shock, carried out on specific portions of the valve.

Preferably $14\% \leq Cr \leq 16\%$.
Preferably $1\% \leq Si \leq 2\%$.
Preferably $0.05\% \leq N \leq 0.12\%$.
Preferably, trace levels $\leq Mn \leq 1\%$.
Preferably Si %/Mn % $\geq 1$.
Preferably $0.2\% \leq Mo \leq 0.5\%$.
Preferably, trace levels $\leq Ni \leq 0.5\%$.
Preferably, trace levels $\leq Al \leq 0.015\%$.
Preferably, trace levels $\leq S \leq 0.003\%$.
Preferably, trace levels $\leq P \leq 0.010\%$.
Preferably, trace levels $\leq B \leq 0.0020\%$.

The final thermal or thermomechanical processing operations may involve a quenching operation followed by a tempering operation.

The final thermal or thermomechanical processing operations may involve an annealing operation followed by a machining operation.

The portions of the valve affected by the localised surface quenching may be the end of the stem and/or the seat contacting surface.

The invention also relates to a unitary valve for an internal combustion engine, characterised in that it has been produced using the method above.

It will be understood that the invention is based firstly on a precise equilibrium of the composition of a stainless steel. It allows the component produced to have a martensitic structure and advantageous mechanical properties following adequate thermomechanical processing operations, and a resistance to corrosion which is close to that of austenitic stainless steels. It is then based on thermal and mechanical processing operations which confer on the valve the remarkable properties thereof, and in particular a localised surface quenching operation, for example (but not exclusively), an HF quenching operation of the portions thereof that are subject to most stress, which ends the production operation.

BRIEF DESCRIPTION OF THE DRAWINGS

The invention will be better understood from the following description given with reference to.

DESCRIPTION OF THE INVENTION

Figure 1:
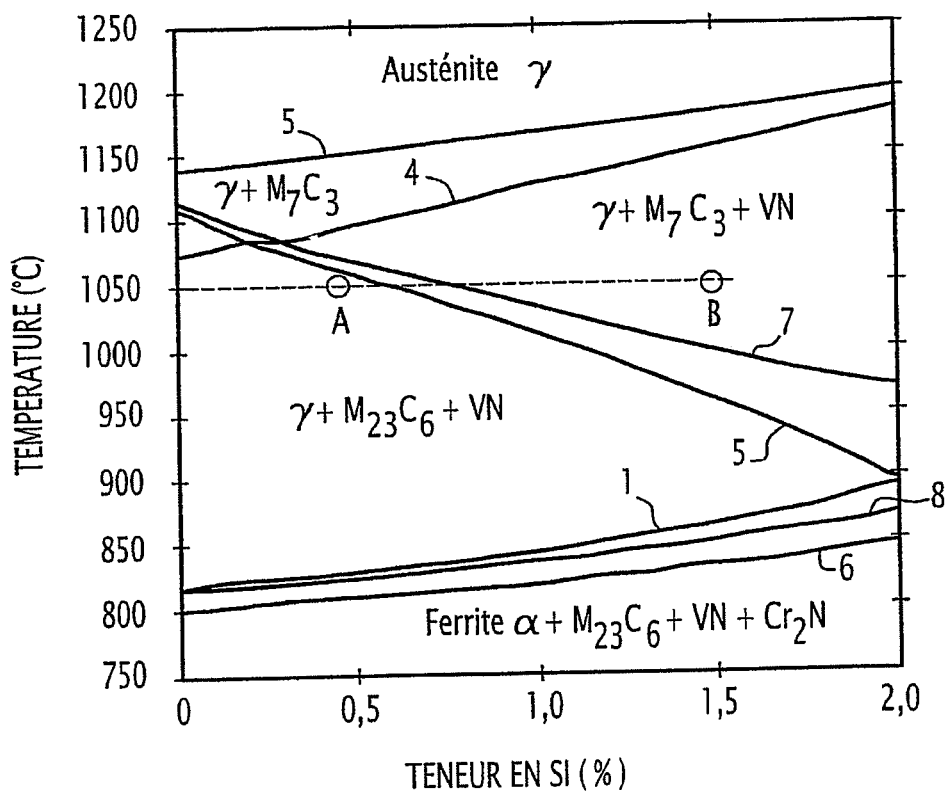
FIG. 1 which shows the phase diagram of an example of a steel which can be used in the invention, in accordance with the content thereof in terms of Si.

The steel used must satisfy various criteria specific to the application envisaged, that is to say, the production of unitary valves for internal combustion engines.

The volume of metal in the stem and the valve head must have levels of hardness and resistance to abrasion which are not too high in view of the finishing sequence of the components (machining, grinding, polishing . . . ) and a sufficient level of ductility.

On the other hand, the seat contacting surface of the valve and the end of the stem must provide a very high level of hardness and resistance to abrasion: to this end, the steel must be able to withstand a specific surface treatment, that is to say, a localised surface quenching operation. A localised surface quenching operation of this type is most conventionally carried out by a method referred to as "high frequency quenching" or HF quenching: this operation involves significantly heating only the zones concerned, using an inductive system, for a brief period of time. The surface of the valves of martensitic steel, which has been locally reaustenitised by this thermal "flash", is then subjected to an abrupt martensitic quenching operation owing to the fact that the thin surface region which has been heated is rapidly cooled by means of conduction by the underlying substrate which has remained cold. Under these conditions, the surfaces which have been treated using HF quenching and whose structure is martensitic readily reach levels of hardness of from 55 to 60 HRC which are those required for the envisaged application. The mean level of hardness desired for constraints of wear resistance is most generally 58 HRC.

It is possible to achieve a comparable result with other methods of surface treatment which involve, in the same manner as HF quenching, a localised surface quenching of the component, such as plasma quenching or laser shock (also referred to as "laser peening").

In addition to these different criteria connected with the use of the valve, the steel used in the invention must also comply with different constraints relating to the production of the valve. The production of the valves is generally carried out in two main phases which each impose strict constraints on the properties and the behaviour of the metal.

The metallurgist first produces, casts and hot forms a steel of a given composition which he then supplies to the valve manufacturer in the form of bars.

This manufacturer then shears the bars into slugs, an operation which is also referred to as "cutting to length", then he carries out the forming of the valves, typically by means of forging or extrusion.

A first requirement is that the steel used in the invention has a moderate material cost.

For the metallurgist, a low material cost first implies the absence of significant additions in terms of costly elements, such as nickel, molybdenum, tungsten . . . and then the use of inexpensive raw materials which are readily commercially available and do not require strict selection. This last point itself implies that the steel desired can tolerate the inevitable residual elements and in variable contents (nickel, copper, vanadium, molybdenum . . . ) which are found in common recycling scrap.

During the production of the steel, the metallurgist must also be able to use high yield installations (conventional electric ovens, continuous casting . . . ) and simple and reliable production methods. Firstly, as soon as the "ingot route" is used by the producer, the steel must be sufficiently "non-quenching" to prevent the phenomena of "cracking" of the ingots (superficial occurrences of fissuring during cooling), which are often a source of waste.

For the person in charge of transforming the materials into semi-finished products (by rolling, or forging, for example), the steel must ideally have good properties in terms of malleability at high temperature and not be susceptible to the formation of cracks in the hot state. In this instance, a low level of quenchability for the steel again constitutes an advantage when the transformation sequence comprises a plurality of intermediate steps involving rolling or forging. A low level of quenchability limits the risks of the intermediate semi-finished products cracking, promoting a softening of the steel using a mechanism involving auto-annealing during returns to ambient temperature.

The constraints which the steel must then comply with in terms of the valve manufacturer are numerous and are generally unavoidable given that production lines are largely integrated and automated.

The manufacturer firstly shears the bars, then he carries out the actual operation for hot forming the valves, either by means of forging or by means of extrusion.

The first shearing operation assumes that the metal is not brittle, it has a low level of hardness and it has a low level of abrasive behaviour with respect to the shearing tools. In particular, the coarse carbides in the steel to be sheared are a cause of deterioration of the cutting blade of the shears and are therefore to be avoided.

In the second major operation for hot transformation of slugs into valves, the metal must comply with the following criteria.

Since the transformation operations are generally carried out at the highest possible temperatures (1150 to 1200° C.), the metal must have a good level of malleability at these temperatures.

Furthermore, since the stem of the valve is generally deformed only to a small extent during this operation, the structure thereof is largely dependent on the structure of the initial bar and in particular on the development thereof during the reheating cycle before forming the valve. The structure of the steel must therefore have a high level of stability in terms of the heating operations at high temperatures (1150-1200° C.).

After the forming operation, the manufacturer carries out the thermal processing and the finishing of the valve. The steel must therefore withstand the thermal processing operations which are carried out in order to comply with the specifications of the user.

Martensitic stainless steels known from the prior art can be classified in two categories, the first comprising steels having a low carbon content (C≤0.1%) and the second comprising steels having a high carbon content (up to approximately 1%).

Martensitic stainless steels having a low content of carbon may typically contain up to 17% of chromium and have a good level of resistance to corrosion, which would be compatible with the preferred application envisaged for the invention. However, these steels are very sensitive to hardening, susceptible to cracks and have difficulty in withstanding the annealing operations which are intended to reduce the hardness. Furthermore, since they contain only a small amount of carbon, their maximum HF quenching hardness does not reach the required levels, whilst their low content in terms of carbides limits their resistance to abrasion.

Martensitic stainless steels having high levels of carbon known from the prior art have a good level of resistance to abrasion, which increases as the quantity of carbides increases, and levels of hardness, in the crude state of HF quenching, which increase in a regular manner with the carbon content. Generally, the hardness of carbon alloy steels increases with the content in terms of carbon. A minimum carbon content of 0.45% is required in order to confer a minimum hardness of 58 HRC on the crude quenched steel.

In the prior art, there are a number of steels containing up to 17% of chromium and more than 0.45% of carbon which comply with several criteria of the specifications defined above. However, none of them fully complies with these specifications. For example, the resistance to corrosion of those which contain more than 0.5% of carbon is very substantially reduced since chromium, which is the element required for corrosion resistance, is "fixed" to a large extent by the chromium carbides $(Fe, Cr)_7C_3$ or $(Fe, Cr)_{23}C_6$. Chromium which is consumed in this manner by the carbides is "taken" from the adjacent matrix whose resistance to corrosion is thus greatly reduced. Furthermore, as the carbon content increases these steels become more brittle in the processed state, or in the softened state.

On the other hand, a majority of these carburised steels contain variable proportions of elements which form carbides, such as molybdenum, tungsten, niobium. They result in an excess of useless material in the envisaged application.

Finally, with the exception of specific examples, the quenchability of the martensitic stainless steels of the prior art is not suitable for the production sequence and production lines of the valves. Generally, steels which are highly charged in terms of chromium and which contain approximately 0.5% or more of carbon offer a high level of quenchability which is unnecessary, or even undesirable, since this involves adding annealing cycles to the production sequence. The steel X85CrMoV 18-2, which is used for inlet valves which are subjected to high levels of stress, and which require high levels of heat resistance, contains a large amount (from 2 to 3%) of molybdenum which is a costly element. It is characterised by a high level of quenchability, which is the cause of high levels of stress which are of thermomechanical origin or which originate from the martensitic transformation, and waste during the production of intermediate products by the steel maker and the transformer (forger or roller).

The present invention is based in particular on an addition to the simple Iron-Chromium-Carbon system of vanadium and two elements which have a very low cost, silicon and nitrogen, in the following proportions (the percentages are percentages by weight):

C: 0.45 to 0.55%
Cr: 12 to 18%, preferably 14 to 16%
Si: 1 to 2.5%, preferably 1 to 2%
Mn: trace levels up to 2%, preferably trace levels up to 1%, preferably with Si %/Mn %≥1
V: 0.2 to 0.5%
Mo: trace levels up to 0.5%, preferably from 0.2 to 0.5%
N: 0.05 to 0.15%, with C+N between 0.55 and 0.70%
Ni: trace levels up to 1%, preferably trace levels up to 0.5%
Cu: trace levels up to 0.25%, or Cu≤0.5×Ni if Cu>0.25%
Co: trace levels up to 1%
W: trace levels up to 0.2%
Nb: trace levels up to 0.15%
Trace levels≤Al≤0.025%, preferably ≤0.015%
Trace levels≤Ti≤0.010%
Trace levels≤S≤0.030%, preferably ≤0.003%
Trace levels≤P≤0.040%, preferably ≤0.010%
Trace levels≤B≤0.0050%, preferably ≤0.0020%
Iron and impurities resulting from the production operation: complement of 100%.

The addition of silicon plays a crucial role in achieving and adjusting all the properties and behaviour required of the steel. In particular, the silicon controls the quenchability of the structure.

Generally, martensitic stainless steels are classed in the category of "self-quenching" steels, that is to say the martensitic transformation of their structure is very easily achieved during a cooling operation from a temperature located in their austenitisation range. For moderate contents in terms of carbon, the austenite of these steels, which has been formed at high temperature, can be cooled to low temperatures, for example, 250° C., without it being the cause of any structural transformation: it is in a metastable state. If the cooling operation is continued, the metastable austenite transforms quite suddenly into martensite from a temperature Ms which is characteristic of each steel.

In steels which are referred to as "self-quenching", the metastability of the austenitic structure is very marked, even with low cooling rates. In this manner, with martensitic stainless steels of the Fe—Cr—C system, which have low or moderate carbon contents, it is possible to obtain a complete core martensitic transformation of products having a large cross-section, even in the case of slow cooling rates, for example, in calm air. This is not possible with the carbon steels of the Fe—C system since the precipitation of the carbide $Fe_3C$ is very rapid and is therefore brought about readily during the cooling operations carried out from the austenitic range. Perlitic decomposition of the austenite is then said to take place.

If this does not then take place in martensitic stainless steels, it is because the carbide $Fe_3C$ is not the carbide of thermodynamic equilibrium. The equilibrium carbide of martensitic stainless steels of the Fe—Cr—C system is the carbide $(Fe, Cr)_{23}C_6$ and the precipitation kinetics thereof are significantly slower than those of the carbide $Fe_3C$.

A high level of quenching ability is advantageous at the stage of the finished products when high levels of mechanical properties are sought by means of thermally processing the steel, but is generally the source of a number of problems during the entire production sequence of the products. It is possible to mention cracks of the bars and semi-finished products, problems relating to brittleness and excessive hardness, the obligation to add annealing cycles to the sequence in order to reduce the hardness of the metal, . . . .

This is all costly in terms of waste products, precautions and burdens on the production sequence and it is for this reason that a low level of quenchability of the steel is preferred at the production stage.

The compositions of steel used in the invention, which are typical of the martensitic stainless steels of the Fe—Cr—C system nonetheless offer a relatively moderate level of quenchability which is suitably adapted to finished products having small dimensions, such as internal combustion engine valves. It is the addition of a content of silicon greater than 1% which confers this property on them. The inventors have found that silicon brings about the stable precipitation of the carbide (Fe, Cr)$_7$C$_3$ in a wide range of austenitisation temperatures when the content thereof is greater than 1%, as illustrated in FIG. 1 which illustrates a pseudo-binary cross-section, in accordance with the content in terms of silicon, of the phase diagram of a composition of steel according to the invention. The other main elements are C=0.55%; Mn=0.5%; Cr=15.5%; Mo=0.3%; V=0.3%; N=0.1%. This chart is a modelling which is carried out using the THERMOCALC software and the TCFE database which are commonly used in metallurgy.

In this chart:
- the limit designated "1" corresponds to the temperature referred to as Ae3 which corresponds to the equilibrium between the range of the austenite γ and the range in which austenite γ and ferrite α coexist.
- the limit designated "4" corresponds to the temperature at which vanadium nitride VN appears during cooling;
- the limits designated "5" correspond to the appearance of the carbide (Fe, Cr)$_7$C$_3$ in the austenite;
- the limit designated "6" corresponds to the temperature referred to as Ae1 which corresponds to the equilibrium between the range in which austenite γ and ferrite α coexist and the range of the ferrite α;
- the limit designated "7" corresponds to the solvus of the carbide (Fe, Cr)$_{23}$C$_6$, which becomes the stable carbide, with substitution of the carbide (Fe, Cr)$_7$C$_3$ below the lower limit "5";
- the limit designated "8", between the limits "1" and "6", is the solvus of the nitride Cr$_2$N.

In an experimental context, the two following compositions were produced and then forged, one being a reference (not in accordance with the invention) having a low content of silicon (A), the other (B) being representative of the steels used in the invention, having a high content of silicon and at least very close to the one above in terms of the other elements. These two compositions are located on the chart of FIG. 1 and are described in table 1.

It should be noted in particular that the two castings have a content in terms of C+N of 0.67%, close to the maximum limit of the invention (0.70%).

The products were forged at 1180° C. using a hammer following prolonged heating to 1180° C. The softening cycle applied to the forged bars was as follows:
- isothermal retention for 8 hours at 775° C.;
- then slow cooling in an oven (less than 40°/h) to 550° C.

After forging and application of the initial thermal processing operation of the softening annealing type, these two compositions were tested using dilatometry in order to define their metallurgical transformation charts in terms of continuous cooling from a temperature of 1050° C., located within their austenitising range.

The level of martensitic or bainitic transformation of the composition A always remains very high for all the cooling rates imposed, which correspond to occurrences of core cooling in air of bars having diameters of between 25 and 200 mm. This material will therefore be susceptible to the formation of cracks at various stages of the forming thereof.

On the other hand, the composition B which is enriched with silicon according to the invention transforms rapidly at a high temperature (between 700 and 800° C.) in accordance with a decomposition of the austenite into ferrite, carbides and nitrides. In dilatometry, the decomposition of the austenite of this steel which is rich in silicon is very similar to the conventional perlitic transformation of carbon steels. For this composition B which can be used in the invention, the residual level of martensitic transformation is negligible for all the cooling rates which correspond to core cooling in air of bars having diameters which are greater than or equal to 50 mm, and remains limited to the core up to a diameter of 25 mm.

The risk of cracks appearing on the products is therefore very low during the entire production cycle of the valves.

Furthermore, the complete martensitic transformation of the composition B of the invention remains possible using the application of a high cooling rate. After dissolving at 1050° C. and oil quenching of samples having a diameter of 20 mm, the structure of the steel B is martensitic and has a hardness of 58 HRC. The structure is also notably finer and more homogeneous than that of steel A. It can be seen in FIG. 1 that, at the time of quenching, the carbides (Fe, Cr)$_7$C$_3$ are present in the steel B whilst the carbides (Fe, Cr)$_{23}$C$_6$ are present in the steel A.

The properties required for the steel compositions used in the invention are obtained owing to the precise equilibrium of the alloy elements.

Carbon is the essential element for conferring its hardness on the martensite, or optionally the bainite, which is/are formed during the quenching operation. The minimum content thereof must be 0.45% in order to reach a level of hardness of 58 HRC after thermal processing, but also in order to achieve a metallurgical structure which is free from delta ferrite.

The maximum content thereof is limited to 0.55%. Above this, the carbon forms too large a quantity of chromium carbides, which is embrittling and disadvantageous for the application, even harmful in the case of solid carbides which originate from the solidification of the bars, whilst the fraction of "free" chromium in the matrix becomes too low for it to have the content required for oxidation.

Silicon is a major additive element of the invention. In order to obtain the low level of quenchability desired, the content thereof must be greater than 1%, preferably greater than 1.4%. It is limited to a maximum of 2.5% in order to retain a structure with no stable ferrite. Silicon provides a second action which is very advantageous for the use of steel by strengthening the resistance thereof to oxidation and corrosion by sulphur: it complements the action of the chromium. It also constitutes an efficient and inexpensive element for deoxidation. However, silicon lowers the temperature at which melting of the steel begins (solidus), which has the result of reducing the forgeability range.

TABLE 1

Composition of the samples tested

| Elements (% by weight) | C | Si | Mn | Ni | Cr | Mo | V | N | W | Nb | Cu | Co | Al | Ti | S | P |
|---|---|---|---|---|---|---|---|---|---|---|---|---|---|---|---|---|
| A (reference) | 0.55 | 0.43 | 0.45 | 0.09 | 15.5 | 0.3 | 0.31 | 0.12 | <0.02 | <0.01 | 0.022 | 0.018 | ≤0.025 | ≤0.010 | 0.0016 | 0.0079 |
| B | 0.55 | 1.45 | 0.52 | 0.09 | 15.7 | 0.3 | 0.39 | 0.12 | <0.02 | <0.01 | 0.022 | 0.018 | ≤0.025 | ≤0.010 | 0.0018 | 0.0082 |

Preferably, the maximum content in terms of silicon will be limited to 2% when the best malleability is sought at high temperature, that is to say, up to 1200° C.

Chromium is an essential element of the steel used in the invention and allows it to be protected relative to the environments of the inlet valve. In the case of exhaust gas reinjection diesel engines, these environments comprise, during operation, hot gases which are oxidising and may be sulphurising in accordance with the content of sulphur in the fuel. The condensates of these gases are also corrosive. Chromium oxide which forms at the surface of the steel is only genuinely continuous and protective for a minimum mean content in the matrix of the steel of 12%. This value is therefore considered to be the minimum content in terms of chromium in the context of the invention. Taking into account that the carbon present in the steel fixes a fraction of the chromium, and that this fraction is therefore no longer available for the formation of the film of oxide, however, the minimum content in terms of chromium in the composition is preferably 14%.

The maximum content in terms of chromium is dictated by the metallurgical equilibrium of the steel and, in particular, by the desire to obtain a structure having a matrix which is purely austenitic, with no ferrite, at temperatures of thermal processing and transformation in the hot state. Without the addition of nickel, an element which retains the austenitic structure but which is also costly, and in the presence of contents of carbon and nitrogen of from 0.55 to 0.70%, as required by the invention, the maximum permissible content of chromium is 18%. Since a significant addition of silicon is carried out in the invention and this element has a similar effect to chromium, that is to say, it promotes the appearance of the ferritic phase, the maximum content in terms of chromium is preferably limited to 16%. Above this, there is a risk of delta ferrite appearing when the contents in terms of Si are high and the contents in terms of C+N are low.

An addition of nitrogen is carried out up to a maximum content of 0.15%, preferably up to 0.12%, so as not to exceed the maximum level of solubility of this element during solidification. This would lead to the formation of bubbles of gas in the metal, which would cause the appearance of porosities (cavities) on the solidified metal.

Nitrogen, which is inexpensive, is used as a complementary additive to carbon for two reasons.

On the one hand, it stabilises the austenitic structure between approximately 1000 and 1200° C. and can therefore partially replace the carbon without the disadvantages of an excessive precipitation of carbides. In this manner, owing to the addition of nitrogen, it is possible to prevent the formation of delta ferrite in a steel which is rich in terms of chromium and which has a limited content in terms of carbon.

On the other hand, nitrogen is beneficial to the corrosion resistance of the steel in the presence of corrosive condensates.

For these two reasons, the minimum content in terms of nitrogen is 0.05%, and must be such that C+N≥0.55% in order to achieve a good equilibrium of the composition (absence of delta ferrite). It must be such that C+N≤0.70% so that the maximum contents in terms of carbon and nitrogen as defined above are not exceeded.

An addition of vanadium is carried out in order to form, with the nitrogen and carbon, precipitates of vanadium nitride and carbide which are stable at the thermal processing temperatures. This allows the expansion of the grain of the structure to be limited at these temperatures where there is a recrystallisation of the metal which has been transformed by means of rolling or forging.

Nitrides and carbides of vanadium are advantageous for the abrasion resistance of the steel and are also known to increase the creep resistance of martensitic steels.

Furthermore, the formation of vanadium nitride VN allows that of chromium nitride $Cr_2N$ to be limited, which depletes the matrix in terms of chromium.

These effects are obtained for a content of vanadium between 0.2 and 0.5%.

A minor addition of molybdenum can also be carried out for the effect thereof, known from the prior art, which is to contribute to limiting the brittleness of the steel processed for high levels of hardness. A significant effect begins to be seen from 0.2%. A maximum content of 0.5% is permitted so as not to increase the material costs of the steel unnecessarily.

These moderate additions in terms of molybdenum and vanadium finally afford the significant economic advantage, during the production of the steel, of allowing the use of raw materials which originate from the recycling of steels which contain these elements.

These materials may also contain other residual elements which are not indispensable for the properties of the steel used in the invention and which can therefore be present only in trace levels. The residual metal elements which are most often found in the charges originating from steels to be recycled, are substantially manganese, nickel, copper, tungsten, niobium and, more rarely, cobalt.

Manganese is present in the majority of ferrous raw materials which are commercially available. It is an element which can be readily oxidised in production ovens, such as the electric arc oven, but the deliberate and forced elimination thereof during the production operation can be found to be costly and it is not advantageous in the invention. Recycling charges may generally contain up to 2%, which is tolerable in the context of the invention, and a large fraction is in any case lost by means of oxidation during the production operation: it is therefore straightforward to restrict the final content in terms of manganese to less than 1% in the steels used in the invention, owing to a judicious selection of a mixture of raw materials which is suitable for the practice of carrying out production of steel in the ovens of steel works.

With regard to the properties sought for the steel used in the invention, manganese may be found to be harmful at contents greater than 2% since it is generally known to reduce the resistance to oxidation and sulphurisation, to stabilise the austenite and to increase the martensitic quenchability of steels. The maximum residual content thereof must therefore be restricted to less than 2% and, preferably, between trace levels and 1%, which is straightforward and inexpensive for the steel maker.

Also in a preferred manner, the steel used in the invention comprises contents of manganese and silicon such that their ratio Si %/Mn % is greater than or equal to 1, since this condition promotes the castability of the liquid metal in cast refractories in the presence of a natural atmosphere.

Nickel is increasingly present in ferrous raw recycling materials: it is thus commonly found in proportions of from 0.2 to 0.4%. In contrast to manganese, the nickel of the raw materials is oxidised only to a small extent during the production operation, for example, in conventional electric arc ovens. It will therefore be found almost integrally in the final metal.

With regard to the steel used in the invention, it is an element which significantly increases the quenchability and which is, for this reason, undesirable at contents greater than 1%. Preferably, the maximum content thereof will be between trace levels and 0.5%.

Copper, like nickel, is also present in common ferrous raw recycling materials, at contents of approximately from 0.1 to 0.2%, even up to 0.4%, and is not eliminated during the production operation. Copper is known to degrade the forgeability of iron-chromium steels since it promotes the formation of a liquid film in the grain boundaries of the steels when they are brought to the very high temperatures of the thermomechanical transformation sequence. It is also known that nickel is very effective in combatting this mechanism of intergranular "liquation" by stabilising the austenite phase to the detriment of the liquid phase. If nickel is present in significant amounts, the steel used in the invention can therefore withstand a relatively high content of copper.

For all these reasons, the maximum content in terms of copper of the steel of the invention is:
either limited to a maximum of 0.25%;
or, if Cu>0.25%, limited to 0.5 times the content in terms of nickel.

Tungsten, which is a costly element, is present in some raw recycling materials. At low contents, the tungsten provides the steels with properties which are similar to those provided by molybdenum. In the prior art, tungsten is thus often considered to be a "molybdenum equivalent" which is defined by Mo (equivalent)=0.5 times the content in terms of tungsten, as a percentage by weight. For these reasons, the steel used in the invention may contain from 0 to 0.2% of tungsten.

Cobalt may exceptionally be found in some specific raw materials. In the same manner as nickel, it has a low level of oxidation during production operations in conventional electric arc ovens. However, in contrast to nickel, cobalt has no harmful effect on the properties and the behaviour of the valves of the invention. The composition of steel used in the invention may therefore comprise up to 1% of cobalt in the form of a residual element.

Niobium is known to form, from very low contents, stable carbides and nitrides which contribute, in the steels, to limiting the expansion of the austenitic grain at temperatures of austenitisation or thermomechanical transformation. Niobium can therefore effectively complement the role of vanadium for controlling the size of the grains in the steel used in the invention. However, niobium is also reputed to promote the precipitation of eutectic carbides and nitrides in an embrittling network during the solidification of steel bars. For these reasons, the niobium content of the steel used in the invention is limited to 0.15%.

An addition of boron is possible. It is considered that this element may provide, in some cases, a high level of cohesion for the grain boundaries. If it is desirable to add boron, which is by no means indispensable in the context of the invention, the content thereof must be between trace levels and 0.0050%, preferably between trace levels and 0.0020%.

Aluminium and titanium are to be avoided owing to the fact that they would form, with nitrogen, nitrides which are embrittling and therefore undesirable.

The content in terms of aluminium must be ≤0.025%, preferably ≤0.015%. The content in terms of titanium must be 0.010%

With regard to sulphur, the standards relating to this type of steel allow up to 0.030%. However, a maximum content of 0.003% is preferred in order to prevent problems of intergranular brittleness and segregations which are conventionally linked to the presence of this element.

With regard to phosphorus, up to 0.040% is allowed, as in the standards, but a maximum content of 0.010% is preferred for the same reasons as for sulphur.

With regard to oxygen, the invention has no specific requirements. Unless a particularly good inclusion property is desired, the oxygen content is sufficient which results naturally from the content of silicon (which is generally the predominant deoxidising element) and the production conditions which are required to obtain the intended contents for the other elements. An oxygen content in the order of 0.0050% or even less may commonly be obtained but is not generally imperative since the mechanical properties which are to be optimised as a priority in the context of the invention are dependent only to a small degree on the inclusion property.

The steels used in the invention can be produced according to methods which are applicable to conventional materials, taking into account their individual characteristics. It is thus not possible to produce them in a vacuum since an addition of nitrogen in gaseous form must be carried out.

To this end, it is possible to use an electric oven, an AOD reactor or any other means suitable for the production of steels which contain high levels of nitrogen, including methods of secondary refinement using the electroslag remelting process. The remelting can be carried out, for example, in slag with a consumable electrode if a significant inclusion property is desired.

The casting of the metal is carried out using either the ingot route or the continuous casting route.

A thermal processing operation for homogenisation of the solidification structures can be carried out, if necessary, at temperatures of between 1150 and 1225° C.

These operations are followed by a step for thermomechanical transformation in the hot state of the cast semi-finished product, for example, forging and/or rolling, at temperatures typically between 1000 and 1200° C. An annealing operation can optionally be used after the hot transformation if it is desirable to soften the structure to the maximum extent for operations at ambient temperature, such as straightening of the bars or a machining operation. The softening of the products can be carried out using an isothermal softening annealing operation at temperatures of between 650 and 900° C., for durations of from 2 to 8 hours, followed by cooling in air or in the oven at the cooling rate of the oven.

The final thermal or thermomechanical processing operation(s) which will confer on the valves their definitive properties and shape is/are then carried out.

This is carried out starting with slugs which are cut from the semi-finished products resulting from the hot transformation and the optional softening annealing operation above. These slugs are then forged or extruded at high temperature (1150-1200° C., for example) in order to form the valves. Then, after cooling, the final thermal processing operations are carried out. These may be a quenching operation followed by tempering or an annealing operation prior to final machining.

In addition, at the end of the production operation, a localised surface quenching operation is carried out, for example, HF quenching or any other method which provides comparable results, in zones which must have a high level of hardness: the seat contacting surface of the valve and/or the end of the stem.

An example of implementation of the method according to the invention is as follows.

The steel was produced in an electric oven, with the following composition C:
C=0.510%
Mn=0.462%
Si=1.43%
Cr=15.77%
V=0.370%
Mo=0.305%

N=0.129%
S=0.0019%
P=0.0094%
Ni=0.075%
W≤0.020%
Nb≤0.010%
Cu≤0.02%
Co=0.017%
Al≤0.025%
Ti≤0.010%
Fe=the balance The total C+N is 0.64%, and therefore in the centre of the range of the invention.

It was then cast to form ingots and transformed into bars of 85 mm by means of rolling, after heating to 1180° C.

The bars were then subjected to an isothermal annealing operation for 8 hours at 880° C., then cooling in the oven to 550° C., the temperature at which the bars were removed from the oven and cooled in air.

The level of hardness of the bars after this softening operation was then effectively low: approximately 235 HB or 22 HRC (the HRC measurement no longer having great significance at this low level of hardness). The core quenchability limit, for a cooling operation in air, corresponded to a diameter of 40 mm.

Then, starting with the bars which are obtained in this manner, the conventional operations were carried out for forming the valve, including forming in the hot state by means of forging or extrusion of all or part of the slug which has been cut from the bar. These were followed, if necessary, by thermal processing operations which adapt the properties of the valve to the wishes of the final client.

In this manner, for example, after a solution heat treatment at 1050° C. for 30 minutes and rapid cooling which corresponded to a diameter of 17 mm cooled naturally in air, the hardness of the bainitic/martensitic structure was 58.5 HRC.

This hardness can then be conventionally modified using a quenching and tempering processing operation. Table 2 illustrates examples of tempering conditions and the levels of HRC hardness which can be achieved under these conditions on the bars above.

TABLE 2

Levels of HRC hardness obtained on steel C in accordance with the tempering conditions.

| Tempering temperature/duration/cooling | HRC hardness |
| --- | --- |
| 500° C./2 h/Air | 57.1 |
| 525° C./2 h/Air | 54.4 |
| 550° C./2 h/Air | 47.4 |
| 575° C./2 h/Air | 44.0 |
| 600° C./2 h/Air | 41.1 |
| 625° C./2 h/Air | 39.5 |
| 650° C./2 h/Air | 37.5 |
| 700° C./2 h/Air | 33.1 |
| 750° C./2 h/Air | 29.4 |
| 800° C./2 h/Air | 24.6 |

Finally, in accordance with the invention, an HF quenching operation was carried out on the end of the stem and/or the seat contacting surface of the valve, in order to generally confer thereon a hardness of from 55 to 60 HRC.

Another example of processing according to the invention is as follows.

The steel was produced, with the following composition D:
C=0.470%
Mn=0.585%
Si=1.36%
Cr=15.40%
V=0.36%
Mo=0.31%
N=0.100%
S=0.0021%
P=0.0068%
Ni=0.08%
W<0.02%
Nb<0.01%
Cu<0.02%
Co=0.017%
Al≤0.025%
Ti≤0.010%
Fe=the balance The total C+N is 0.57%, and therefore in the lower part of the range of compositions used in the invention.

The cast ingot was homogenised for 8 hours at 1120° C., then forged using a hammer, into a bar having a square cross-section with sides of 17 mm, at a temperature of 1180° C. Following the forging operation, the bars were fed into an oven at 650° C., for a duration of 2 hours, for a processing operation for softening the metal by means of post-forging isothermal annealing.

At this stage, the metal was tested using the "rapid" traction test at the deformation rate of 85 mm/s and at temperatures of between 1000 and 1230° C., in order to increase the malleability thereof in the range of temperatures of thermomechanical transformation. The malleability of the metal is defined by the usual parameters of the traction test, that is to say, the elongation at break (A %) and the cross-section reduction in the region of the break (Z %). The heat resistance is illustrated by the variable of maximum stress at break (Rm Mpa).

Figure 2:
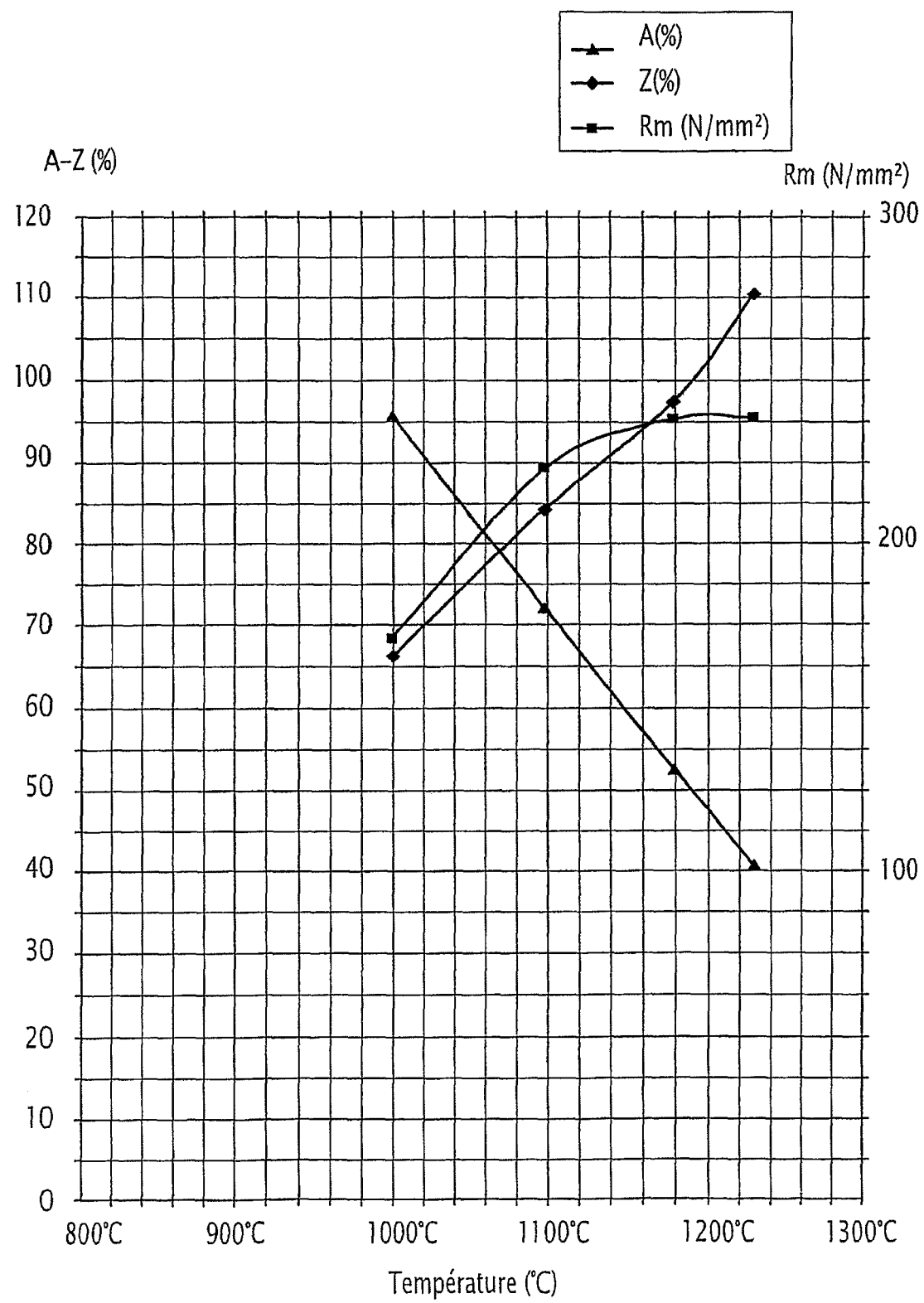
FIG. 2 which shows the mechanical properties in accordance with the temperature of an example of a steel which can be used in the invention.

The curves showing the evolution of these variables in accordance with the temperature are presented in FIG. 2: the malleability of the steel having composition D has a maximum between 1100 and 1230° C., characterised by the highest values of A and Z(%).

Below 1100° C., the continuous increase in the mechanical strength (Rm) progressively reduces the plasticity of the metal.

For this composition D, for which the sum of the contents C+N is at the lower limit of the values according to the invention, the rate of martensitic transformation, measured following dilatometry tests carried out at various cooling rates from the austenitisation temperature of 1050° C., becomes negligible for all the cooling rates lower than or equal to that which corresponds to natural core cooling in air of a bar having a diameter of approximately 60 mm.

Furthermore, the martensite which is formed following a more rapid cooling operation from 1050° C. has a hardness of 57.7 HRC.

Then, the operations for forming the valve were carried out.

Subsequent tempering of the purely martensitic structure then allowed a very wide variety of levels of hardness to be obtained in the steel having composition D, as indicated below in Table 3:

TABLE 3

Levels of HRC hardness obtained on steel D in accordance with the tempering conditions.

| Tempering processing operation | HRC Hardness |
|---|---|
| 500° C./2 h/Air | 56.6 |
| 525° C./2 h/Air | 52.3 |
| 550° C./2 h/Air | 46.9 |
| 575° C./2 h/Air | 43.8 |
| 600° C./2 h/Air | 41.2 |
| 625° C./2 h/Air | 39.6 |
| 650° C./2 h/Air | 38.2 |
| 700° C./2 h/Air | 32.2 |
| 750° C./2 h/Air | 27.6 |
| 800° C./2 h/Air | 24.5 |

Finally, an HF quenching operation was carried out on the end of the stem and/or the seat contacting surface of the valve, in accordance with the invention.

Figure 3:
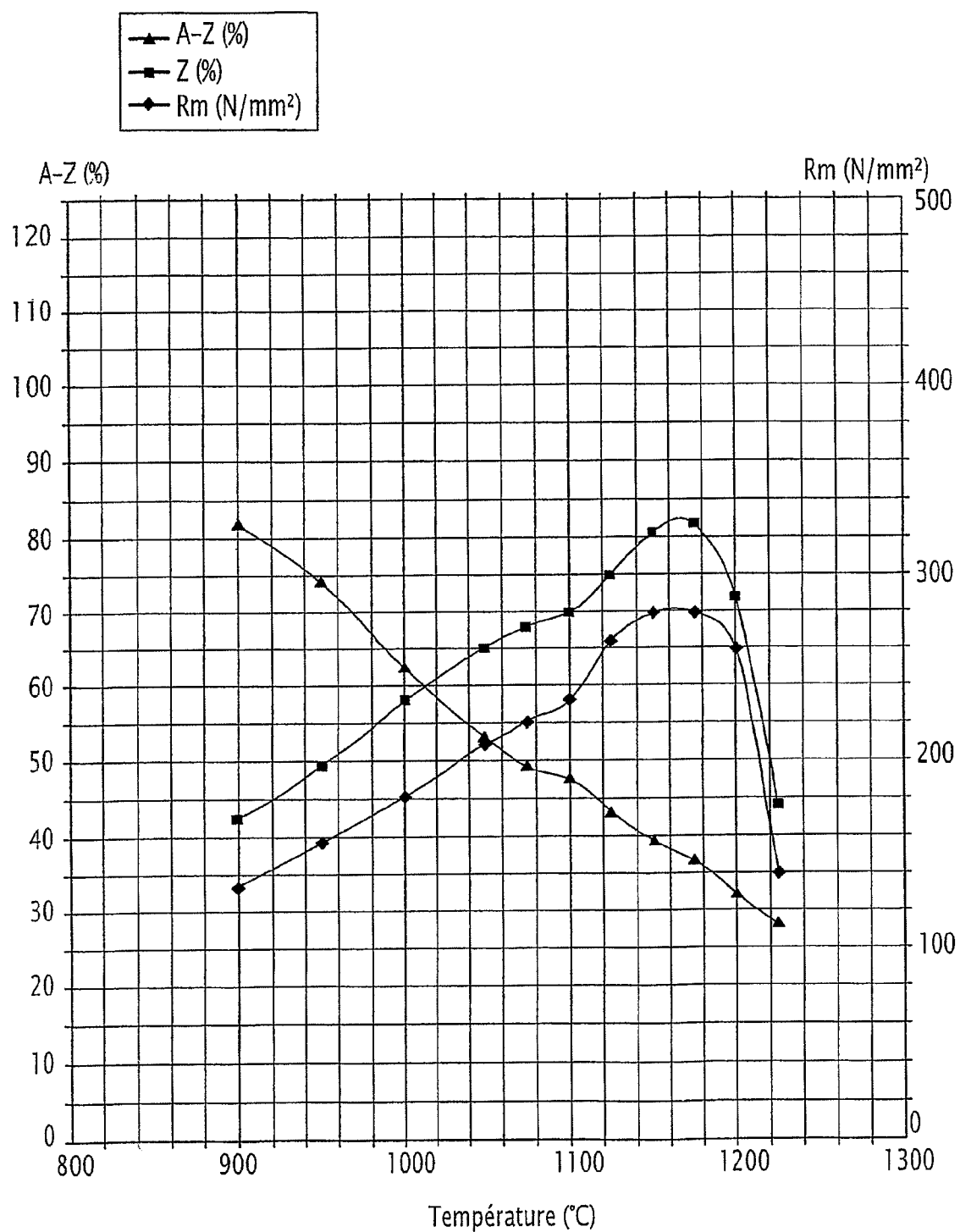
FIG. 3 which shows the mechanical properties in accordance with the temperature of an example of a reference steel which is not in accordance with the invention.

By way of comparison, FIG. 3 illustrates, in the same manner as FIG. 2, the development lines of A %, Z % and Rm in accordance with the temperature for a steel E having a composition which is not in accordance with the invention:

C=0.837%
Si=0.758%
Mn=1.22%
S<0.0001%
P=0.016%
Ni=0.252%
Cr=17.35%
Mo=2.29%
V=0.478%
Cu=0.088%
N=0.0290%
B=0.0017% the balance being iron and impurities.

This steel E is therefore a chromium/molybdenum martensitic stainless steel having a high content in terms of carbon, of the X85CrMoV 18-2 type cited above. The metal originates from an ingot of approximately 1.5 tonnes from an industrial casting. This ingot was homogenised at the temperature of 1170° C., then rolled to the gross diameter of 90 mm, starting from this temperature. Furthermore, the bar used for the test was processed by means of isothermal annealing at 830° C., for softening before peeling and cutting.

The malleability of this steel has a marked maximum in a range of limited extent between approximately 1120 and 1200° C., then drops rapidly. This steel is therefore very substantially less tolerant than steel D to variations in the processing conditions. In particular, in absolute terms, the malleability thereof is substantially less than that of steel D, the maximum A % and Z % values thereof being very much lower than those of steel D. In this manner, in addition to having a material cost which is significantly higher owing to the massive presence of molybdenum, this reference steel E overcomes the technical problems posed substantially less well than the steels used in the context of the invention.

The invention claimed is:

1. Method for producing a unitary valve for an internal combustion engine, comprising, in sequence,
producing and casting a steel having a composition, in percentages by weight, of:
0.45%≤C≤0.55%
12%≤Cr≤18%
1%≤Si≤2.5%
trace levels≤Mn≤2%
0.2%≤V≤0.5%
trace levels≤Mo≤0.5%
0.05%≤N≤0.15%, with 0.55%≤C+N≤0.70%
trace levels≤Ni≤1%
trace levels≤Cu≤0.25%, or Cu≤0.5 Ni
trace levels≤Co≤1%
trace levels≤W≤0.2%
trace levels≤Nb≤0.15%
trace levels≤Al≤0.025%
trace levels≤Ti≤0.010%
trace levels≤S≤0.030%
trace levels≤P≤0.040%
trace levels≤B≤0.0050%
the balance being iron and impurities resulting from the production operation;
thermomechanically transforming the steel in the hot state by means of one or both of rolling and forging between 1000 and 1200° C.;
optionally, carrying out a softening annealing operation between 650 and 900° C. for from 2 to 8 hours followed by cooling in air or oven;
cutting slugs from the steel;
conducting a final thermal or thermomechanical processing operation(s) to confer on the unitary valve the definitive properties and shape thereof, including hot forming the slugs by means of forging or extrusion and terminating with a localized surface quenching operation, comprising one of an HF quenching operation, plasma quenching or laser shock, carried out on specific portions of the unitary valve,
wherein the steel contains $(Fe,Cr)_7C_3$ carbides, vanadium carbides and vanadium nitrides.

2. Method according to claim 1, wherein 14%≤Cr≤16%.

3. Method according to claim 1, wherein 1%≤Si≤2%.

4. Method according to claim 1, wherein 0.05%≤N≤0.12%.

5. Method according to claim 1, wherein trace levels≤Mn≤1%.

6. Method according to claim 1, wherein Si %/Mn %≥1.

7. Method according to claim 1, wherein 0.2%≤Mo≤0.5%.

8. Method according to claim 1, wherein trace levels≤Ni≤0.5%.

9. Method according to claim 1, wherein trace levels≤Al≤0.015%.

10. Method according to claim 1, wherein trace levels≤S≤0.003%.

11. Method according to claim 1, wherein trace levels≤P≤0.010%.

12. Method according to claim 1, wherein trace levels≤B≤0.0020%.

13. Method according to claim 1, wherein the final thermal or thermomechanical processing operations include, after the hot forming of the slugs, a quenching operation followed by a tempering operation.

14. Method according to claim 1, wherein the final thermal or thermomechanical processing operations include, after the hot forming of the slugs, an annealing operation followed by a machining operation.

15. Method according to claim 1, wherein the portions of the valve affected by the localised surface quenching are the end of the stem or the seat contacting surface, or both.

16. A unitary valve for an internal combustion engine produced by the method according to claim 1.

* * * * *